(12) United States Patent
Olch (10) Patent No.: US 7,009,501 B2
(45) Date of Patent: Mar. 7, 2006

(54) SYSTEM AND METHOD OF OPTICAL DATA COMMUNICATION WITH MULTIPLE SIMULTANEOUS EMITTERS AND RECEIVERS

(75) Inventor: Ronald Howard Olch, Van Nuys, CA (US)

(73) Assignee: Disney Enterprises, Inc., Burbank, CA (US)

( * ) Notice: Subject to any disclaimer, the term of this patent is extended or adjusted under 35 U.S.C. 154(b) by 102 days.

(21) Appl. No.: 10/444,461

(22) Filed: May 22, 2003

(65) Prior Publication Data
US 2004/0234268 A1 Nov. 25, 2004

(51) Int. Cl.
*B60Q 1/00* (2006.01)
(52) U.S. Cl. .................. 340/435; 340/436; 340/903; 180/167; 180/169; 342/42; 342/70; 701/301
(58) Field of Classification Search ............... 340/435, 340/903, 904, 436, 992; 701/119, 23, 300, 701/301, 117; 180/167, 169; 342/42, 70
See application file for complete search history.

(56) References Cited

U.S. PATENT DOCUMENTS

| | | | |
|---|---|---|---|
| 4,531,238 A | 7/1985 | Rawson et al. | |
| 4,757,450 A | 7/1988 | Etoh | |
| 4,776,041 A | 10/1988 | Husbands | |
| 4,990,892 A | 2/1991 | Guest et al. | |
| 5,062,151 A | 10/1991 | Shipley | |
| 5,079,640 A | 1/1992 | Gfrerer | |
| 5,181,229 A | 1/1993 | Langlais et al. | |
| 5,319,487 A | 6/1994 | Sato | |
| 5,402,257 A | 3/1995 | Hasselmann et al. | |
| 5,426,425 A | 6/1995 | Conrad et al. | |
| RE35,035 E | 9/1995 | Shipley | |
| 5,627,524 A | 5/1997 | Fredrickson et al. | |
| 5,633,742 A | 5/1997 | Shipley | |
| 5,684,871 A | 11/1997 | Devon et al. | |
| 5,745,272 A | 4/1998 | Shipley | |
| 5,818,617 A | 10/1998 | Shipley | |
| 5,819,008 A | 10/1998 | Asama | |
| 5,838,472 A | 11/1998 | Welch et al. | |
| 5,864,414 A | 1/1999 | Barnsley et al. | |
| 5,912,752 A | 6/1999 | Mollett et al. | |
| 5,959,754 A | 9/1999 | Sakurai et al. | |
| 5,982,762 A | 11/1999 | Anzai et al. | |
| 6,008,923 A | 12/1999 | Samdahl et al. | |
| 6,057,949 A | 5/2000 | Kinstler | |
| 6,112,152 A | 8/2000 | Tuttle | |
| 6,154,300 A | 11/2000 | Cho | |
| 6,188,496 B1 | 2/2001 | Krishna et al. | |
| 6,222,440 B1 | 4/2001 | Heller | |

(Continued)

FOREIGN PATENT DOCUMENTS

GB  2 342 251 A  4/2000

(Continued)

*Primary Examiner*—Davetta W. Goins
(74) *Attorney, Agent, or Firm*—Greenberg Traurig, LLP; Margo Maddux; Neer Gupta, Esq.

(57) ABSTRACT

The system and method of the present invention optically transmits redundant packets of data using infrared signals at pseudo-random intervals to allow a receiver to distinguish between multiple simultaneous sources. The emitters repeatedly transmit a short packet at randomized intervals much shorter than the frame rate. Statistical analysis shows that the probability of collision of the desired packet with a packet from some other source is sufficiently low such that timely reception of at least one uncorrupted packet in the required time frame is assured.

33 Claims, 6 Drawing Sheets

U.S. PATENT DOCUMENTS

| | | |
|---|---|---|
| 6,252,691 B1 | 6/2001 | Porzucki et al. |
| 6,298,047 B1 | 10/2001 | Steffes |
| 6,400,281 B1 * | 6/2002 | Darby et al. ................. 340/933 |
| 6,426,819 B1 | 7/2002 | Crimmins et al. |
| 6,442,145 B1 | 8/2002 | De Lange et al. |
| 6,469,634 B1 | 10/2002 | Williams et al. |
| 6,480,313 B1 | 11/2002 | Kawamura |
| 6,614,387 B1 * | 9/2003 | Deadman ..................... 342/70 |
| 6,631,322 B1 * | 10/2003 | Arthur et al. ............... 701/211 |
| 6,765,495 B1 * | 7/2004 | Dunning et al. ............ 340/903 |

FOREIGN PATENT DOCUMENTS

WO     WO 01/95287 A1    12/2001

* cited by examiner

Assumptions/Method:

| Symbol | Description | Value | Units | Alternative bit rates --- | | | | |
|---|---|---|---|---|---|---|---|---|
| b | bits per byte | 10 | bits | 10 | 10 | 10 | 10 | 10 |
| B | bytes per packet | 6 | bytes | 6 | 6 | 6 | 6 | 6 |
| fb | baud rate | 38,400 | bps | 57,600 | 115,200 | 250,000 | 500,000 | 1,000,000 |
| Tf | frame period | 50 | msec | 50 | 50 | 50 | 50 | 50 |
| Ts | subframe period | 6 | msec | 6 | 6 | 6 | 6 | 6 |
| Tr | ride period | 5 | mins | 5 | 5 | 5 | 5 | 5 |
| Ns | No. interface sources | 4 | number | 4 | 4 | 4 | 4 | 4 |
| Tpp | Packet period $Tpp = \frac{bB}{Fb}$ | 1.56 | msec | 1.04 | 0.52 | 0.24 | 0.12 | 0.06 |
| Np | Packet periods per subframe period $Np = \frac{Ts}{Tpp}$ | 3.84 | number | 5.76 | 11.52 | 25.00 | 50.00 | 100.00 |
| Nsf | Number of subframes $Nsf = \frac{Tf}{Ts}$ | 8.33 | number | 8.33 | 8.33 | 8.33 | 8.33 | 8.33 |
| Pf | Probability of a fault in every subframe $Pf = \left[1 - \left(1 - \frac{Tpp}{Ts}\right)^{(Ns-1)}\right]^{Nsf}$ | 1.33E-02 | number | 9.83E-04 | 6.48E-06 | 1.52E-08 | 5.56E-11 | 1.88E-13 |
| | Frames per fault -(1/Pf) | 7.52E+01 | number | 1.02E+03 | 1.54E+05 | 6.60E+07 | 1.80E+10 | 5.33E+12 |
| Pr | Probability of at least one fault per ride $Pr = \frac{TrPf}{Tf}$ | 79.79 | number | 5.90 | 0.04 | 0.00 | 0.00 | 0.00 |
| | One faulted frame every -(1/Pr) | 1.25E-02 | rides | 1.69E-01 | 2.57E+01 | 1.10E+04 | 3.00E+06 | 8.89E+08 |

FIG. 5b

SYSTEM AND METHOD OF OPTICAL DATA COMMUNICATION WITH MULTIPLE SIMULTANEOUS EMITTERS AND RECEIVERS

BACKGROUND OF THE INVENTION

1. Field of the Invention

The invention relates to optical networking. More particularly, the invention relates to a system and method of optical networking among multiple simultaneous transmitters and receivers.

2. General Background and State of the Art

There are many applications where digitally-encoded information must be transmitted in a timely and reliable fashion between stationary to stationary, stationary to mobile, or mobile to mobile systems. Optical carriers, usually of infrared wavelength, or radio frequency signals are often used for communication in such applications where wired connections are impractical. Due to the inherently different properties of both optical and radio frequency signals, the use of one type of signal may be appropriate in applications where others are not.

For example, optical signals require that objects in communication have a clear line of sight between each other. Radio frequency signals, on the other hand, do not require communicating objects have a direct line of sight. Radio frequency signals can easily move around objects and pass through walls, etc. However, radio frequency signals are not easily constrained to a localized area and therefore easily interfere with nearby areas which also may be utilizing radio frequency transmission.

Optical signals have not traditionally been used for communication in applications where objects are moving, or more particularly where there are multiple transmitters and receivers moving in the same area, because a direct line of sight between transmitter and receiver cannot always be guaranteed. Systems composed of a single transmitter and one or more receivers are more straightforward in that there are no competing interference sources to the transmitted signal. However, in instances where there may be many possible transmitters in optical view of many receivers, then interference of light from one to another may result in overlapped packets, and the receiver not being able to distinguish valid data from one or more of these transmitters within a required time frame. The receiver then cannot decipher good data from any of them.

Radio frequency methods can of course, be applied to the problem of multiple simultaneous emitters and receivers, however all communicating sites must potentially be covered resulting in a much larger required bandwidth, complex multiplexing schemes and potential for interference which, essentially, further increases the required bandwidth and complexity to maintain an effective data rate.

There have been several prior art approaches to the general problem of multiple optical emitters and receivers sharing one environment without interference.

One method employed is a type of space-division multiplexing as is disclosed in U.S. Pat. No. 6,008,923 to Samdahl et al. wherein an array of relatively narrow transmit beams are accessible to multiple client nodes in the same space. The transmitters are typically stationary and are directed to not overlap. Therefore, this solution is not applicable to situations in which the transmitters and receivers may be moving independently of each other.

U.S. Pat. Nos. 5,818,617, 5,745,272, 5,633,742 and 5,062,151 to Shipley attempt to address the problem of communicating with and locating personnel in a large facility. Personnel wear portable transmitters and desire maximum battery life. This system avoids the effects of interference of transmitters by timing the transmission of data packets. The timing of transmission of each data packet is based on a clock circuit which uses a RC time base. The natural jitter of the clock causes successive packet transmissions to vary in time such that if packets from two transmitters were sent at the same time, it is very unlikely that they would transmit their next packets at the same time. The discrete, custom circuit design emphasizes power efficiency vs. off the shelf component capable design, and deals with cases of two conflicting transmitters for item or person tracking as opposed to multiple simultaneous moving transmitters and receivers.

U.S. Pat. No. 5,819,008 describes a mobile robot sensor system whereby transmitting/receiving units are mounted on the periphery of each of a number of mobile robots. The robots receive data from other surrounding robots or reflections of their own signals in order to avoid collisions. All of the transmitters on each robot send its identification, direction of motion and speed. Each robot can compute if it is on a collision path with another robot using the ID of which of its 8 sensors received a signal from which of another robots 8 sensors (64 combinations) and the associated direction and speed information. (Although the encoding of which of the 8 transmitters is sending the data is not made clear in the patent.) Each bit of data transmission is represented by three pulses. The first is always ON (probably a carrier frequency pulse train though not described in the patent), the second is the data (ON or OFF) and the third is always OFF. Thus valid groups of bits are 100 and 110. Invalid groups (indicating interference) would be 101 and 111. Overlap between groups received from two different transmitters could result in a valid group becoming invalid and thus discarded. A data packet would consist of many of these bit groups.

There seem to be several problems with this method. One is that it is possible for two packets to overlap with no interference detected but only one of the packets properly recovered. If the packets happen to be transmitted in synch periodically, then during these periods, no data would be received from the second transmitter, which could result in a collision. The second problem is that, assuming a ON pulse consists of many cycles of a carrier signal, then the overlap of slightly out of phase ON pulses from two different transmitters could cause the first ON pulse to be ignored by the receiver (since it might look like a continuously ON light) and thus look like a 0 when a 1 is really sent. Another problem with this method is that it is non-deterministic, meaning there is no guarantee that a data packet is received within a specified time frame. This is important in applications where data must be transmitted and received in limited amounts of time.

Finally, U.S. Pat. No. 5,946,118 describes a method for collision detection of transmitted infrared data to meet the needs of a CSMA/CD (IEEE 802.3) communications system. Data is transmitted by using two different wavelengths, one for 1's and the other for 0's. A receiver is included with each transmitter which receives IR signals both from its own transmitter as well as others. A collision is detected when the energy level of either wavelength exceed a threshold value at the same time its own output should be off. Transmitters wait a random backoff time to retransmit a packet if upon the first attempt, an associated receiver detects a collision from some other transmitter in the same medium. This method, however, requires a receiver at each transmitter and that both contain two sets of LED's, PIN diodes and filters to distinguish the two wavelengths.

SUMMARY OF THE INVENTION

It is therefore an object of the present invention to provide a means of reliable wireless communication of digital data between simultaneous moving and nonmoving objects.

The system and method of the present invention involves optically transmitting redundant packets of data using infrared signals at pseudo-random intervals to allow a receiver to distinguish between multiple simultaneous sources. The emitters repeatedly transmit a short packet at randomized intervals much shorter than the frame rate. The frame rate is defined as the amount of time by which data must be successfully transmitted from an emitter to a receiver. The frame rate is determined by the application. Statistical analysis shows that the probability of collision of the desired packet with a packet from some other source is sufficiently low such that timely reception of at least one uncorrupted packet in the required time frame (frame rate) is assured. Packet collision causes errors in the received data, detectable by the receiver when compared with a checksum included with the data. The high redundancy of emitted data also aids in reception in poor environmental conditions.

Each receiver receives packets from many emitters. The packets received are checked for errors. If they are found to be corrupted, they are thrown away. Complete/good packets are accepted and analyzed to see what receiver it was intended for. The packet may, for example, contain an address. The packets can also be identified based on the information it contains as being intended for the receiver. Each receiver only pays attention to data that is intended for it, and throws away data intended for other receivers.

The period between reception of good data packets from any particular transmitter is dependent on the transmission bit rate, length of packets, the minimum random time between their transmission and the maximum number of transmitters which may be in range of a receiver at any time. The effective data rate, that is, the minimum number of bytes of data expected to be received per second (which is lower than what would be obtained with simple, direct transmission at the base rate without interference) is derived from these parameters which must be designed to meet the required rate of a particular application.

Operating characteristics of the system of the present invention are furthermore a function of the optical power of the emitters, sensitivity of the receivers/optics which determine the distance at which receivers will reliably obtain data from transmitters. The system will not pass through bad data due to marginal reception conditions.

The system and method of the present invention solves the problem in the art of transmitting data to simultaneously moving and non-moving emitters and receivers by requiring each transmitter to send short packets of data redundantly, at randomized intervals such that the probability of receiving at least one non-overlapped packet within some specified minimum interval is close to 1.

The present invention is particularly suited for a situation where a object, such as a vehicle, is only interested in communicating with other vehicles which are in close proximity to it and not to the entire set of vehicles. A receiver discards corrupted packets and is equally likely to receive good packets from all of the transmitters in view. Each vehicle's receiver selects only the packets which are intended for it and sends on such packets to an associated computer in order to identify and process the information in the packets.

One application of this type of communication is in amusement park rides or automobiles where a vehicle needs to obtain information such as position and speed of the vehicle(s) ahead to avoid collisions.

DETAILED DESCRIPTION OF THE INVENTION

As mentioned above, one application for the optical data communication method of the present invention is to provide communications directly between vehicles for purposes of maintaining distance and required closing speed. In an exemplary embodiment of the present invention, a speedway ride system utilizes the optical data communication method of the present invention to communicate speed from each leading vehicle to the vehicle behind it so that the vehicles do not collide with each other.

The speedway racing system comprises a plurality of vehicles operated by guests traveling simultaneously on a plurality of tracks. It is desired to prevent guests from colliding with other vehicles, since collisions can cause injuries. Collisions can be avoided by ensuring that the speed of a vehicle is not sufficiently fast to catch up to the vehicle ahead of it and hit it. Such collisions can be detected and prevented if each vehicle knows the speed of the vehicle ahead of it, as well as the distance to the vehicle ahead of it. The distance is computed from the difference of its own position on the track and the received position of the leading vehicle.

Therefore, in an exemplary embodiment of the present invention, it is desired that each vehicle transmits its position on the track and its velocity to the vehicle directly behind it on the same track. The trailing vehicle then makes calculations based on its own position on the track and its current velocity to detect whether or not it will collide with the vehicle ahead of it. Based on these calculations, the on-board computer may prevent the guest from increasing the speed of the vehicle, or take necessary measures to avoid a collision.

Figure 1:
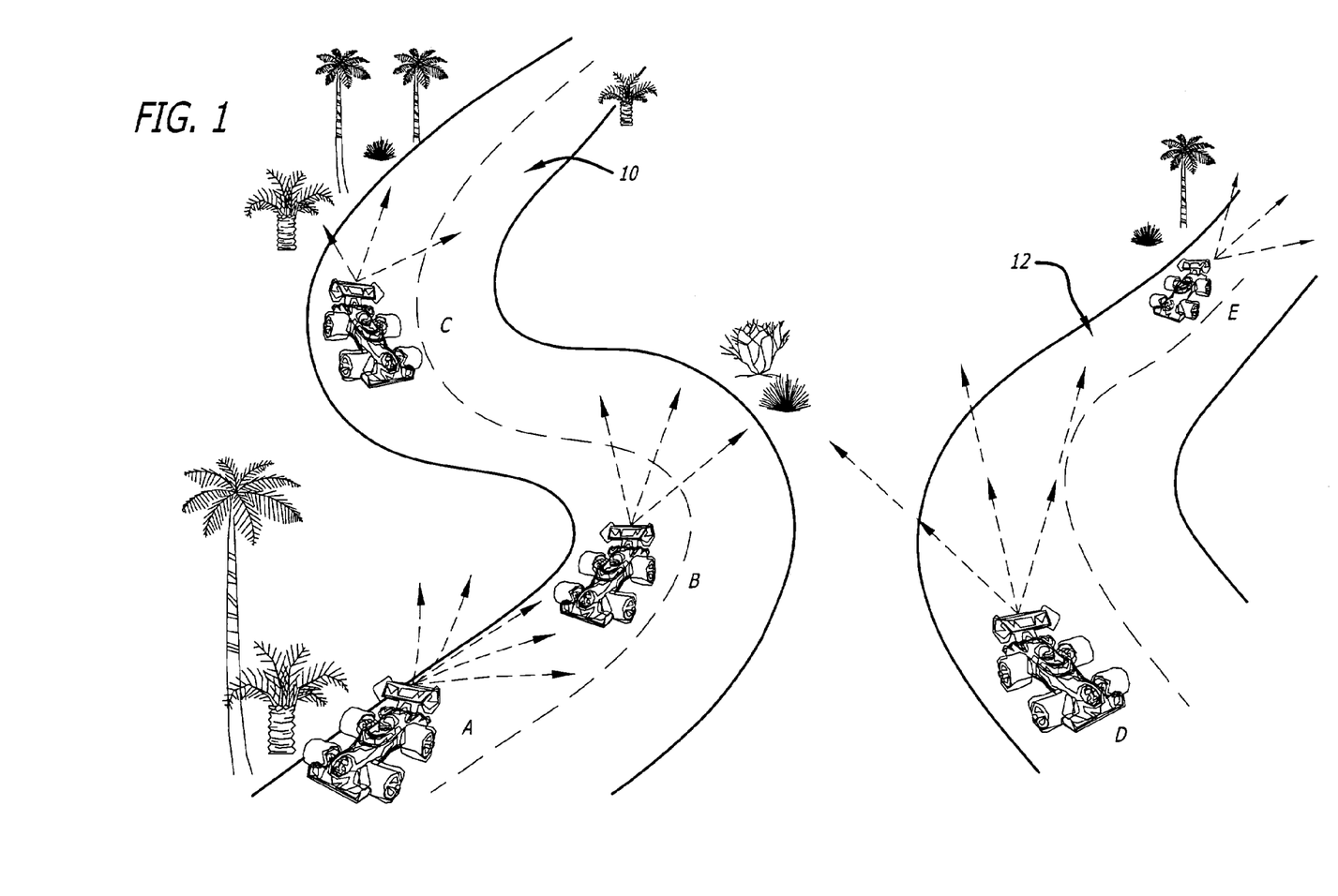
FIG. 1 is a schematic illustrating a view of an exemplary embodiment of the system of the present invention.

Referring more particularly to the drawings, an exemplary embodiment of the speedway system in accordance with present invention is illustrated in FIG. 1. Two tracks 10 and 12 of a speedway ride system are shown in relatively close proximity to each another. Vehicles operate simultaneously on each track. Each vehicle is outfitted with an optical emitter and receiver. In one embodiment, it is preferable for the optical emitter to be mounted towards the rear of the vehicle, and the optical receiver towards the front of the vehicle. This is because each vehicle will be transmitting data to the vehicle behind it, and receiving data from the vehicle in front of it. Of course, in other applications, it may be convenient to mount the optical emitter and receiver in other locations depending on the intended use.

Each vehicle is further outfitted with an on-board computer. The on-board computer regularly communicates the vehicle's current velocity and position data to the optical transmitter for transmission to the trailing vehicle. Each vehicle's velocity is derived from an encoder or tachometer in communication with the engine of the vehicle. The on-board computer is also responsible for processing data received at the receiver from other vehicles.

As vehicles move around the track, they regularly transmit data including vehicle velocity and position, intended for the vehicle behind it, in order to prevent collisions. The trailing vehicle may be directly behind at a relatively short distance, or may be at an angle to the right or the left up to 25 feet away. Also, several vehicles may be in range of the transmitting vehicle at any time, including vehicles on separate tracks. Therefore, each vehicle may receive information from several other vehicles besides the vehicle directly ahead of it.

For example, on track 10 of FIG. 1, there are a number of vehicles shown. On track 12 there is one vehicle shown. Each of the vehicles wants to communicate only to the vehicle traveling directly behind it on the same track. For example, vehicle A wants to communicate its velocity and position to vehicle B, and in turn, vehicle B wants to communicate its velocity and position to vehicle C. However, due to the nature of infrared signals, transmission of data cannot physically be directed towards only a single vehicle's receiver. When vehicle A transmits data from its transmitter, data may reach not only the intended vehicle B, but also vehicle C, or any other vehicles in sight of vehicle A. Similarly, when vehicle D on track 12 transmits infrared data from its transmitter, vehicles A through C in the first lane may all receive its data. Therefore, each vehicle, or infrared receiver, must be capable of determining what data to pay attention to.

The table below shows the desired infrared communication vs. the actual infrared reception for the vehicles shown in FIG. 1.

| Desired | Actual |
|---------|--------|
| A → B   | A → B, C, E |
| B → C   | B → C, E |
| D → E   | D → B, C, E |

In one embodiment of the present invention, each receiver determines what data it should pay attention to based upon position. For example, each vehicle only pays attention to data from the vehicle on the same track closest to it. The vehicle position may be obtained from a variety of sources, however in an exemplary embodiment, vehicle position is obtained from a radio frequency ID tag reader subsystem. The speedway tracks have radio frequency tags which are positioned at regular distances, perhaps every few feet, along the track. In one embodiment of the present invention, the radio frequency tags are embedded in or underneath the track such that the vehicles pass over the tags. The vehicle reads each radio frequency tag as it passes over them. The tag responds to radio frequency energy emitted by the vehicle's RFID reader by sending data representing track position and lane number, since there may be a plurality of tracks or lanes to consider.

Figure 2:
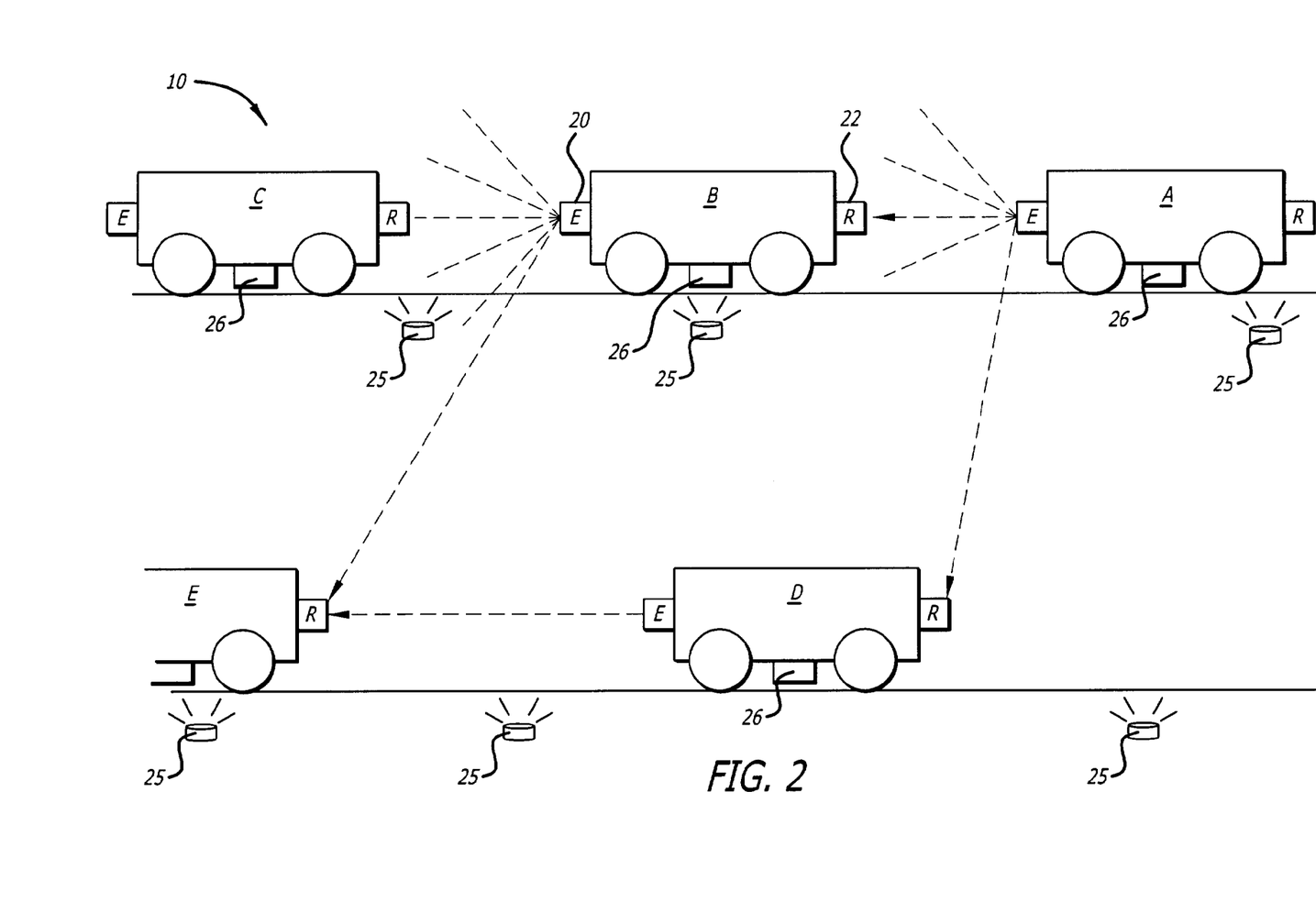
FIG. 2 is a schematic illustrating another view of an exemplary embodiment of the present invention.

Therefore, in one particular embodiment of the present invention, data is directed towards specific vehicles based on each vehicles position relative to another. In the speedway system of the present invention, and similar applications, each vehicle can deterministically infer the address of the emitter it needs to receive from because its data shows that it its coming from the vehicle immediately ahead and on the same track as the receiver. However, other methods may be used to direct data to the right object. In other embodiments, each vehicle or object may have a fixed address, and data packets each include the address of the object it is intended for. There are certain disadvantages to this method, however. This method requires that each object know the identity of the object it desires to send data to. This would not be convenient when directed towards applications such as the speedway system, since the order of each vehicle could never change. FIG. 2 illustrates a more detailed view of an exemplary embodiment of the speedway system in accordance with the present invention. Vehicles A, B and C are shown on track 10. Vehicle D and E are shown on track 12. Each vehicle is outfitted with infrared emitter 20 and infrared receiver 22. In this particular embodiment of the present invention, the receiver is generally positioned at the front of the vehicle so as to receive signals from vehicles ahead of it, and the emitter is positioned at the rear of the vehicle so as to transmit signals to the vehicle traveling behind it. Position tag emitters 25 are shown along each track 10 and 12. Position tags provide small packets of data which identify the position via radio frequency signals. Tag readers 26 are generally located underneath each vehicle.

Each vehicle regularly collects its own velocity and position data and packages the data into discrete data packets for transmission. In one embodiment of the present invention, each data packets consists of six bytes. The first byte is traditionally a header byte. Two position bytes comes next, which represent the vehicle's position. One position byte represents the track or lane that the vehicle is traveling on, while the other byte represents the specific location of the vehicle on the corresponding track. The vehicle's velocity is transmitted in another byte. Finally, two bits are used for error checking. In this embodiment, two cyclic redundancy check (CRC) bytes are used. Of course, other methods of error checking such as parity or a checksum could also be used. The general idea is that the transmitter calculates and transmits a value and the receiver performs the same calculations and compares the result with the check value. This ensures that all data has been received correctly, without errors, and is an important feature of the present invention.

As mentioned earlier, the system and method of the present invention optically transmits redundant packets of data using infrared signals at pseudo-random intervals to allow a receiver to distinguish between multiple simultaneous sources. The emitters repeatedly transmit a short packet at randomized intervals much shorter than the frame rate. Statistical analysis shows that the probability of collision of the desired packet with a packet from some other source is sufficiently low such that timely reception of at least one uncorrupted packet in the required time frame is assured.

Therefore, each vehicle may receive a data packet many times in an incomplete or corrupted form. It is the job of the receiver to analyze each received packet to ensure that it has been received properly. If the packet has been corrupted, it is thrown out. Only data packets that are received properly are kept and analyzed further. If the receiver receives a complete and uncorrupted data packet, it then checks to see if this data packet is intended for this receiver.

As mentioned earlier, in this embodiment of the present invention, this is determined by comparing the position data of the data packet with the position data of the receiving vehicle to see if they are in close proximity. For example, vehicle A wants to transmit its velocity and position data to vehicle B, which is following it on the same track. Due to the nature of infrared signals, not only vehicle B, but vehicles C and D are likely to receive data that is sent from vehicle A's infrared emitter. Vehicles on other tracks are also likely to receive vehicle A's signals, such as vehicles D and E. Similarly, vehicle B is also simultaneously transmitting its velocity and position information to vehicle C behind it. Likewise, vehicle D wants to transmit its velocity and position information to vehicle E behind it on track 12.

Therefore, it is up to each vehicle to accept only the data for which it is intended. Vehicles B, C, D and E each must decide if they pay attention to the data packet they received from vehicle A. This is done by reading the received data packet, evaluating the position information contained within the packet, and comparing with its own position information. For example, vehicle D can clearly ignore the data it receives from vehicle A, since the position information from vehicle A shows that it is on a completely different track. For vehicles, B and C, the decision is not so clear.

Since vehicle B is also transmitting its own position and velocity information to the vehicle behind it, vehicle C is likely receiving data from both vehicles A and B. Vehicle C must decide which data to pay attention to. This is accomplished by comparing the position data for received packets, and paying attention to whatever is closest. A receiver/host computer can select data from any transmitter or group of transmitters at any time and discard what is not required.

Figure 3:
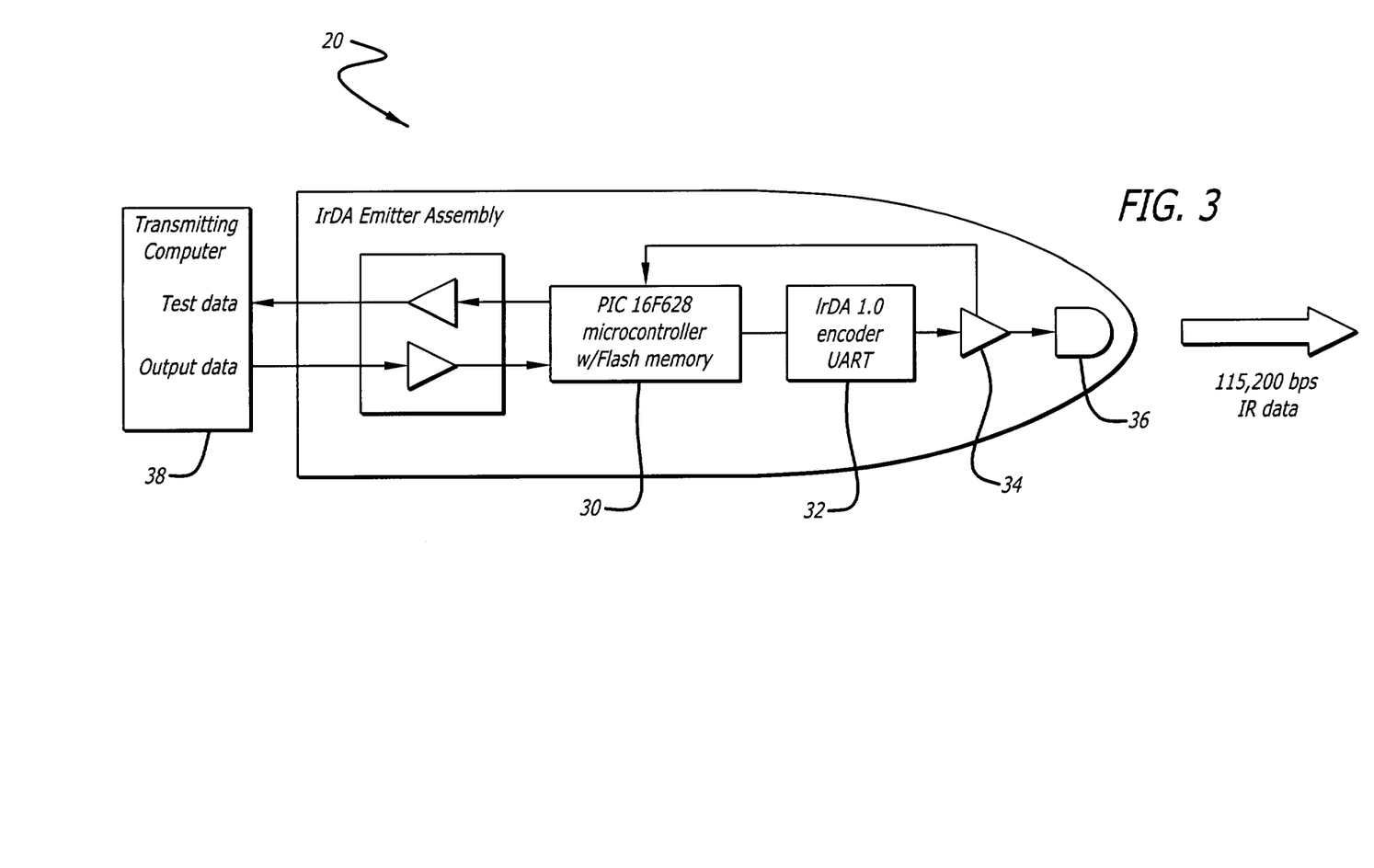
FIG. 3 is a block diagram of an exemplary embodiment of an infrared emitter in accordance with the present invention.

An exemplary embodiment of an infrared emitter in accordance with the present invention is shown in FIG. 3. The infrared emitter preferably comprises its own microprocessor and memory 30. The infrared emitter also includes encoder 32 and driver 34. Encoder 32 is to encode data in accordance with infrared data (irDA) standards. The emitter comprises an array of infrared LED's 36. The number of infrared LED's 36 depends on mounting considerations to achieve desired coverage angle and distance to the receiver. The energy required to transmit, or the distance to the receivers will determine the number of LED's 36 necessary. The infrared emitter may transmit at 115,200 bits per second. The emitters each contain their own microprocessor 30 to generate a varying test pattern, each with a unique ID code. The emitter sends self-test results to a connected computer (PC) 38 for processing if output self-test is required.

Figure 4A:
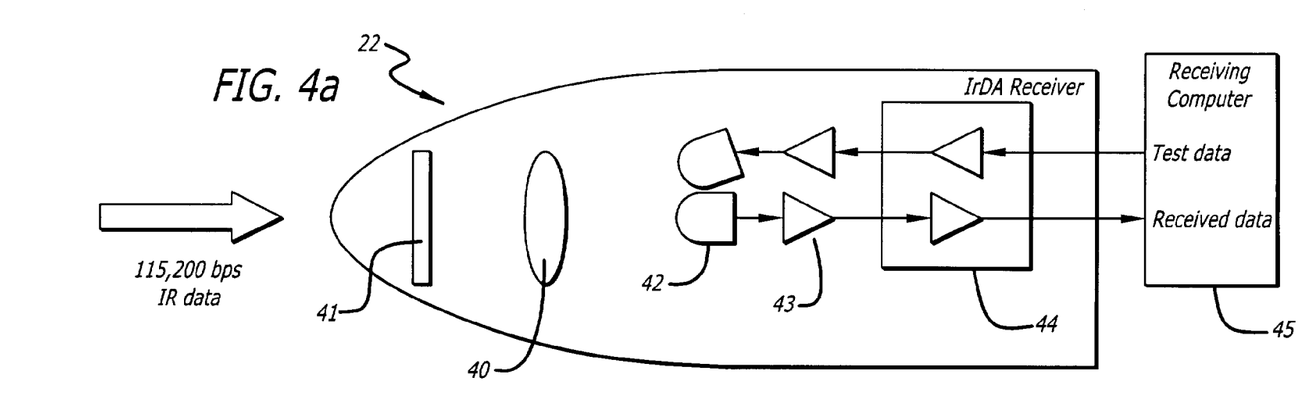
FIGS. 4a–b are block diagrams of an exemplary embodiment of an infrared receiver in accordance with the present invention.
Figure 4B:
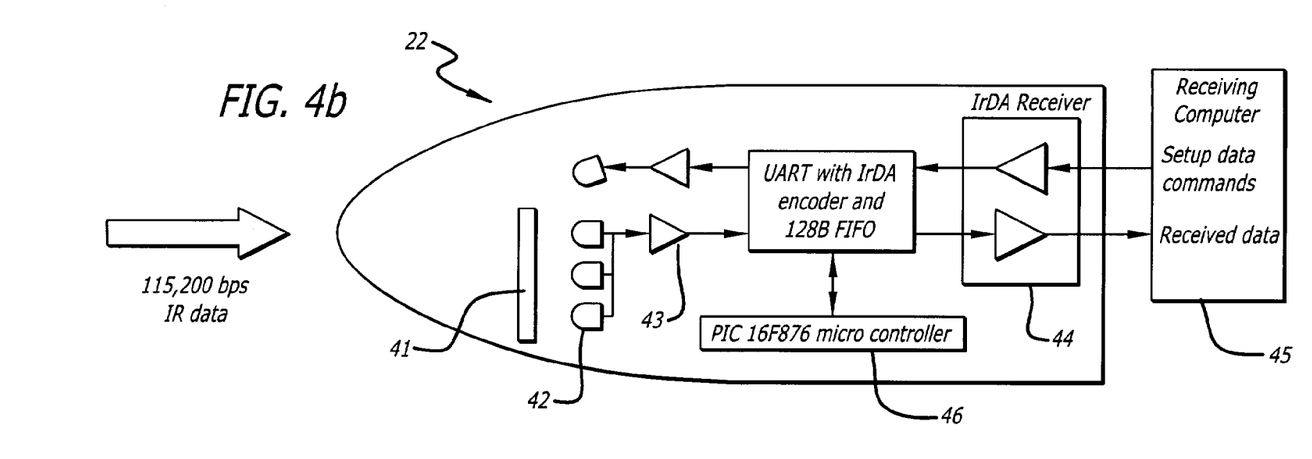

An exemplary embodiment of an infrared receiver in accordance with the present invention is shown in FIGS. 4a–b. FIG. 4a shows a small built-in emitter used for self-test purposes. Infrared signals are received at the collecting lens 40. A shading slit 41 is provided for adjusting the angle at which data signals are received. The collecting lens 40 and shading slit 41 are options to adjust the received distance and angle of the transmitted IR beam for, e.g., wider angle reception without multiple PIN diodes or rejection of sunlight at higher elevations. An array of photo diodes 42 may be used in lieu of the collecting lens 40. Multiple receiver PIN diodes can be utilized for more optical sensitivity or wider angle of reception of the infrared signal. A photo diode 42, amplifier 43, and transceiver 44 are linked in series. An embedded receiver or transmitter microprocessor may be downloaded or commanded by the host computer to change the transceiving protocol, packet length, etc. to dynamically adjust to changing requirements such as the number of transmitters in the area. FIG. 4b is a self-contained version comprising a micro controller 46 which provides a connected computer 45 with only the data it requires whereas in the receiver shown in FIG. 4a, the connected computer 45 must do all the processing.

The infrared receiver must be able to operate reliably at receive angles of as much as 45 degrees off axis from line of sight to the transmitter. The emitter must simultaneously be up to 15 degrees off axis and still be received. This information must also be transmitted in all weather conditions including low sun angles, fog, and rain.

Other infrared emitters and receivers may be used in practicing the present invention.

An exemplary approach to how to determine what conditions should be used in accordance with the present invention is now described. FIG. 6 shows a table of the variables that must be considered. Some initial calculations are also shown. Variables which can be adjusted to modify this probability are the bit rate, the size of the data packets, time between transmission of packets, the frame period, and the total number of sources.

Figure 5A:
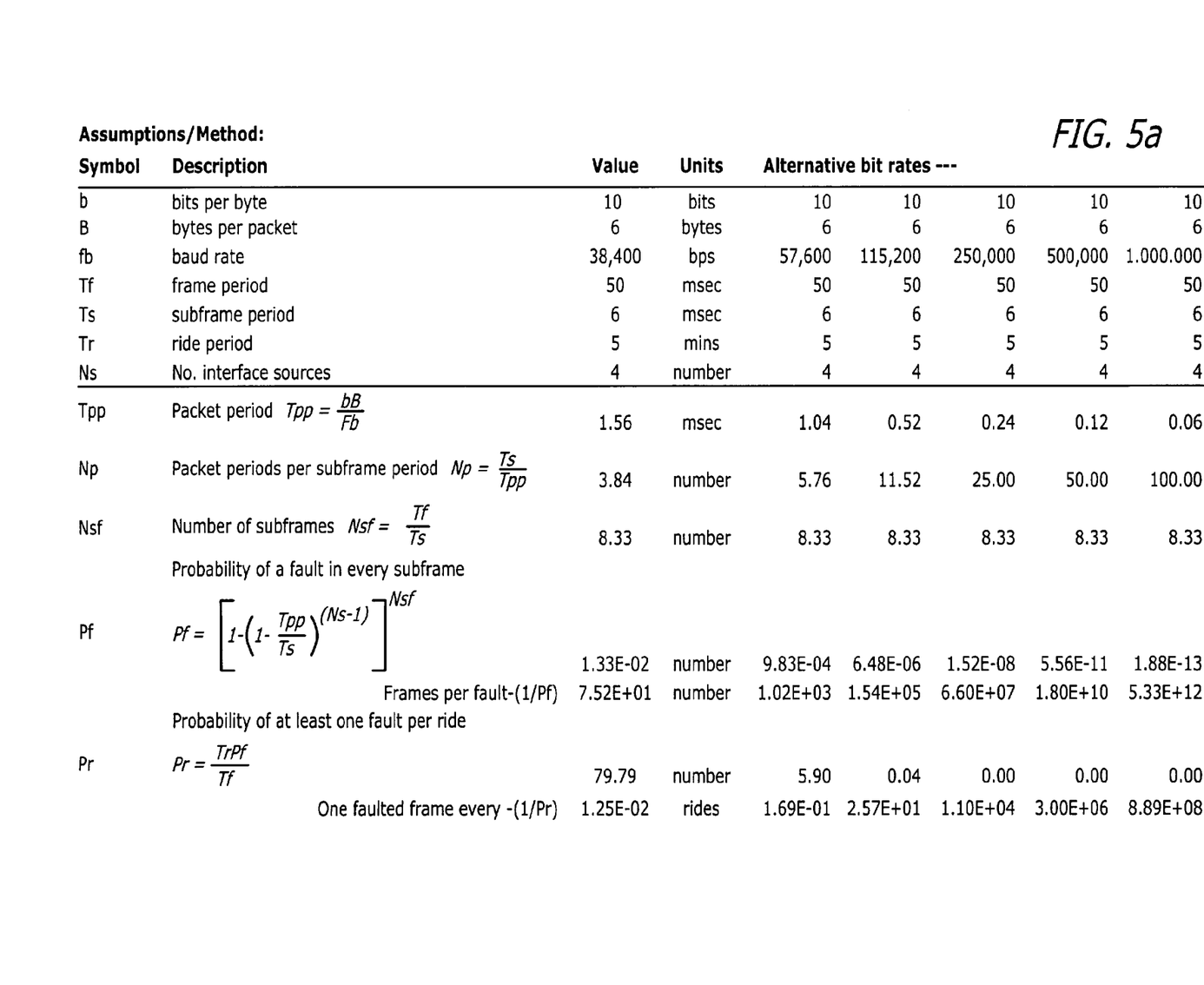
FIG. 5a–b display exemplary calculations in accordance with an embodiment of the present invention.

In the exemplary speedway system of the present invention, each data packet contains six bytes. In FIG. 5a, the number of bytes per packet is denoted as B. The number of bytes per packet is, of course, variable, and dependent on the nature of the application, and what kind or how much data needs to be transmitted. In the exemplary speedway system of the present invention, there is a relatively small amount of data that needs to be transmitted at any time. Other applications may require that more information be sent, and thereby the number of bytes per packet, or the overall packet size, may be larger.

The rate at which data is transmitted is another variable that effects the outcome of the present invention. Infrared data is commonly transmitted at 115,000 bits per second. Other common data transmission rates are shown in FIG. 5a. The transmission rate is denoted as $F_b$. Of course, various data transmission and reception rates can be used. For example, standard infrared data rates include 4 Mbps. The higher the data transmission rate for a fixed packet size, the more redundant packets can be sent within a given frame time thus allowing a larger number of transmitters to be independently recognized (noninterfering). This redundancy also aids reception in lower visibility conditions. The higher rate could also allow longer data packets without decreasing their number.

As has been discussed thus far, in the exemplary speedway embodiment of the present invention the frame period, or the required time in which data must be successfully transmitted and received, is 50 msec. This is also just an example and is not intended to be limiting. The frame period is highly dependent on the nature of the application and environmental conditions. For the speedway system, the frame period needs to be sufficiently short so as to ensure that data is being received in time to control the ride vehicle's speed. For other applications, it may not be necessary that data is transmitted in such a short time, and therefore, the frame period can be larger. The frame period is denoted as $T_f$.

The subframe period, or maximum period of time between transmission of data packets, is also a variable that is considered when determining the parameters of a system in accordance with the present invention. In the exemplary speedway embodiment, the subframe period is 6 msec. The subframe period is denoted as $T_s$.

The number of interference sources must also be considered when determining the parameters that should be followed in practicing the present invention. In the present example, the number of interference sources is 4. In general, the larger the number of sources trying to communicate at one time, the higher the probability of interference.

Taking these variables into consideration, one can easily calculate the packet period $T_{pp}$, or the amount of time to transmit a single data packet. The table shown in FIG. 5a illustrates that the packet period is directly related to the data transmission rate, and in the present example, ranges from 1.56 msec for the lower transmission rate of 38.4 K bps, to 0.06 msec for the highest transmission rate of 1 M bps.

Although the number of packets per frame may vary through a wide range, the average over many frames is a constant. Thus the problem becomes one of the random distribution of a fixed number of packets into a fixed number of time slots per source. We desire to know the probability that every packet from one source within a frame will be overlapped by a packet from another source (the fault mode) and then extend this to the number of such faults over the course of the entire ride. We would like this probability to be very low.

The probability of a fault occurring in every subframe can be calculated using the following equation.

$$Pf = \left[1 - \left(1 - \frac{Tpp}{Ts}\right)^{(Ns-1)}\right]^{Nsf}$$

The calculated probabilities for the various transmission rates using this equation is shown in FIG. 5a. The probability of a fault in every subframe decreases with higher data transmission rates. The probability of at least one fault occurring during the course of the entire ride is therefore:

$$Pr = \frac{TrPf}{Tf}$$

These equations are not intended to be limiting. There are many other variations on the above listed equations which may be used to calculate the probability of a fault occurring.

For purposes of exemplary calculations, in one embodiment of the present invention, we assume that only one data packet is transmitted every subframe. We assume that packet transmission is aligned on exact $T_f/T_{pp}$ time slots. In practice, packet transmission may however, be continuous and overlap by any number of bits. In this scenario, emitters output a maximum of one packet per subframe at a randomized time/position.

The probability of k interferences within one subframe is calculated using the following equation.

$$P(k) = \frac{(Ns-1)!}{[k!(Ns-k)!]p^k q^{(Ns-1-k)}}$$

Using the above, equation, we can determine the probability of no interference from N−1 sources in one subframe, by substituting k=0.

$$P(0) = q^{(Ns-1)} = (1-p)^{(Ns-1)}$$

$$P(0) = \left(1 - \frac{Tpp}{Ts}\right)^{(Ns-1)}$$

Similarly, one can calculate the probability of a fault occurring in every subframe:

$$P(\text{fault}) = [1 - P(0)]^{Nsf}$$

$$P(\text{fault}) = \left[1 - \left(1 - \frac{Tpp}{Ts}\right)^{(Ns-1)}\right]^{Nsf}$$

The above calculations used a predetermined or fixed number of subframes. We can also perform probability calculations with the number of subframes per frame as a variable. In these exemplary calculations, we assume a standard data transmission rate of 115,200 bits per second.

$$Tpp = \frac{bB}{f_b}$$

The subframe period is the number of packet periods per subframe period

Ts=NpTpp

The probability of a fault occurring in every subframe is $$P(\text{fault}) = [1 - P(0)]^{Nsf}$$

$$P(\text{fault}) = \left[1 - \left(1 - 2\frac{Tpp}{Ts}\right)^{(Ns-1)}\right]^{Nsf}$$

$$P(\text{fault}) = \left[1 - \left(1 - \frac{2}{Np}\right)^{(Ns-1)}\right]^{\left(\frac{Tf}{Np \times Tpp}\right)}$$

Using this exemplary equation, one can determine the optimal number of packets to transmit per subframe. For example, using the following numbers of packets per subframe, ranging from 4 to 24, the probability of a fault occurring, and also the number of frames per one fault, are calculated. The results are shown in the table below.

|  | Packets per subrame | | | | | |
| --- | --- | --- | --- | --- | --- | --- |
|  | 24 | 20 | 16 | 12 | 8 | 4 |
| P (fault) | .00279 | .00190 | .00129 | .000992 | .00139 | .0406 |
| Frames per fault, or 1/P (fault) | 359 | 527 | 773 | 1010 | 717 | 246 |

Figure 5B:
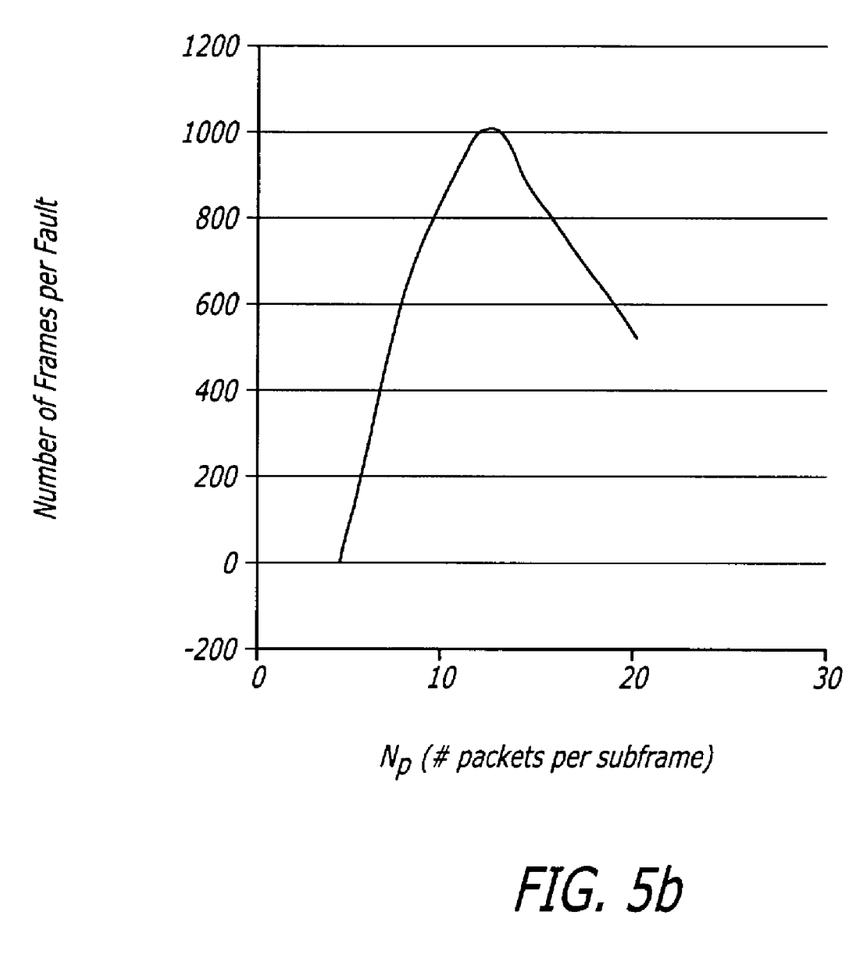

The results of these calculations are also plotted on the graph shown in FIG. 5b. The graph shows the number of frames per fault as a function of the number of packets per subframe. From the graph, we see an optimal number of packets per subframe to use for the circumstances outlined above. The graph, as well as the equations discussed, are not meant to be limiting in any way and are used for exemplary purposes only.

The period between reception of good data packets from any particular transmitter is therefore dependent on the transmission bit rate, length of packets, the minimum random time between their transmission and the maximum number of transmitters which may be in range of a receiver at any time. The effective data rate, that is, the minimum number of bytes of data expected to be received per second (which is lower than what would be obtained with simple, direct transmission at the base rate without interference) is derived from these parameters which must be designed to meet the required rate of a particular application.

In the instance that a good packet is not received within a frame time, the system's response may be to slow the vehicle until a good packet is received (probably only 50 msec later). More typically, the dynamics of the vehicle and its response to controls are such that the frame rate could be much longer than the 50 msec, shown in the example.

This way, multiple receivers and transmitters can coexist simultaneously in the same area. The number of transmitters that can coexist in the same area is limited. The number of transmitters is limited by the probability calculation based on frame rate, packet size and bit rate. However, the number of receivers is unlimited since each one receives all of the transmitted packets (some overlap and are discarded) but selects only those with desired identifying information.

Many other applications exist for the optical data communication system and method of the present invention. For example, the speedway ride application described in the present application could extend to automated highways of the future where vehicles are automatically spaced so that collisions do not occur.

The present invention could be used to allow automated machines or robots to communicate with each other. For example, the present invention could be implemented in manufacturing. Manufacturing robots may receive data from the items they are working on or bins of parts in an environment containing many robots, bins and assemblies.

The present application could also be used in applications where intelligent toys communicate to each other. Each toy might have a transmitter, a receiver or both and respond appropriately to changes in other toys. For instance, a number of talking toy characters, are all in the same environment but only appropriate pairs carry on conversations with each other. Their actions are synchronized by exchanging infrared data without interference by others carrying on simultaneous conversations. The simplicity of the hardware required allows sufficiently low cost for toy applications (among others).

Intelligent household appliances may similarly autonomously integrate their activities or respond in a unique way to each person who wears an infrared emitter integrated into a watch or badge. Identification badges worn by workers which communicate to time logging systems as well as work area equipment to automatically adjust the environment to match the worker's requirements or preferences or provide him with only the objects or data he needs. This could also be used to authorize him access to restricted computers, areas, etc.

In general, the present invention could be used in a number of applications where groups of objects want to communicate with each other. The present invention has been described in terms of selecting to receive data based on location. However, in other embodiments, receivers may choose to receive data based on a number of criteria, including applicability, timeliness, inference, etc.

The present invention is not limited to infrared communications. The same principals can be used with any wavelength of light, if appropriate for the application. Infrared signals are typically used because receivers are more immune from interference from visible light sources and so people cannot see the light transmissions.

This concept of avoidance of interference between sources at the same transmitting frequency would also work for radio based system where all the transmitters were at the same frequency. Each transmitter would have to be able to turn its carrier on only during randomized intervals of data transmission. Time for receivers to lock onto this carrier would have to be taken into account in calculating net data throughput. Transmitter power, receiver sensitivity and locality of receivers and transmitters as well as other interference sources would need to be considered in a way similar to optical applications.

In closing it is to be understood that the embodiments disclosed herein are illustrative of the principals of the invention. Other modifications may be employed which are within the scope of the invention. Accordingly, the present invention is not limited to that precisely shown and described in the present specification.

What is claimed is:

1. A method of detecting and preventing vehicle collision between at least two vehicles, one vehicle being a leading vehicle, and another being the trailing vehicle, the method comprising the steps of:

providing an infrared emitter at the rear of the leading vehicle so as to communicate data to at least the trailing vehicle behind it;

providing an infrared receiver at the front of a trailing vehicle so as to receive data from at least the leading vehicle;

providing radio frequency emitters in close proximity to the vehicles that transmit data about vehicle's position;

providing an on-board computer for regularly gathering the vehicle's velocity and vehicle's position;

transmitting velocity and position data from the infrared emitter of the leading vehicle;

receiving data at the receiver of the trailing vehicle;

calculating, at the wailing vehicle, the distance from the leading vehicle to the trailing vehicle; and predicting whether a collision will occur based on the distance calculated and the current velocity of the trailing vehicle.

2. The method of claim 1 further including the step of regulating the velocity of the vehicle so as to avoid a collision.

3. The method of claim 1 further including the step of providing a warning to the driver that a collision will occur.

4. A method of optical communication of data from a first object to a second object out of a plurality of objects, the method comprising the steps of:

providing a wireless emitter at the first object;

providing a wireless receiver at the second object;

determining a frame rate, the frame rate being a time limit by which a data packet must be successfully transmitted from the first object to the second object;

repeatedly transmitting the data packet at random intervals substantially shorter than the frame rate from the wireless emitter;

reading each data packet received at the receiver;

rejecting data packets tat have been corrupted; and analyzing the remaining data packets to see if they are intended for the second object based upon the applicability of at least a portion of the contents of the data packet.

5. The method of claim 4 wherein applicability is based upon the location of the object.

6. The method of claim 4 wherein applicability is based upon the velocity of the object.

7. The method of claim 4 wherein the first and second objects are moving.

8. The method of claim 4 wherein the wireless emitter and wireless receiver utilize infrared signals.

9. The method of claim 5 wherein the first and second objects are vehicles.

10. The method of claim 7 wherein the first object is leading the second object on a track or lane.

11. The method of claim 9 wherein each vehicle has a tachometer, and the velocity of each vehicle is periodically read from the tachometer.

12. The method of claim 9 wherein the data transmitted comprises the vehicle's velocity and position.

13. The method of claim 4 wherein one or more objects other than the second object are also simultaneously receiving data transmitted from the first object.

14. The method of claim 12 wherein said step of analyzing data packets to see if they are intended for that receiver comprises reading the vehicle position and accepting data if it is in close proximity to the receiving vehicle.

15. A method of optical communication of data from a first object to a second object om of a plurality of objects, the method comprising the steps of:

providing a wireless emitter at the first object;

providing a wireless receiver at the second object;

determining a frame rate, the frame rate being a time limit by which a data packet must be successfully transmitted from to first object to the second object;

repeatedly transmitting the data packet at random intervals substantially shorter than the frame rate from the wireless emitter;

reading each data packet received at the receiver;

rejecting data packets that have been corrupted; and analyzing the remaining data packets to see if they are intended for the second object based upon applicability, and not based upon an address that is unique to each object.

16. The method of claim 15 wherein the first and second objects are moving.

17. The method of claim 15 wherein the wireless emitter and wireless receiver utilize infrared signals.

18. The method of claim 16 wherein the first and second objects are vehicles.

19. The method of claim 16 wherein the first object is leading the second object on a track or lane.

20. The method of claim 18 wherein each vehicle has a tachometer, and the velocity of each vehicle is periodically read from the tachometer.

21. The method of claim 18 wherein the data transmitted comprises the vehicle's velocity and position.

22. The method of claim 15 wherein one or mare objects other than the second object are also simultaneously receiving data transmitted from the first object.

23. The method of claim 21 wherein said step of analyzing data packets to see if they are intended for that receiver comprises reading the vehicle position and accepting data if it is in close proximity to the receiving vehicle.

24. A method of optical communication of data from a first object to a second object out of a plurality of objects, the method comprising the steps of:

providing each of the plurality of objects with an optical emitter for transmitting and an optical receiver for receiving data;

determining a frame rate, the frame rate being a time limit by which a data packet must be successfully transmitted from a first object to a second object;

repeatedly transmitting the data packet at random intervals substantially shorter than the frame rate from the optical emitter, the data packet containing information about the state or the first object;

reading each data packet received at the receiver of the second object;

rejecting data packets that have been corrupted; and comparing the information about the state of the first object from within the data packet with the state of the second object and determining if the data packet is intended for the second object based upon the relative states of the first and second objects.

25. The method of claim 24 wherein the state is the location of the object.

26. The method of claim 24 wherein the state is the speed of the object.

27. The method of claim 24 wherein the step of analyzing whether a data packet is intended for tat receiver is based on timeliness.

28. The method of claim 4 wherein the frame rate is determined based on the nature of the optical communication application.

29. The method of claim 4 wherein to step of repeatedly transmitting is such that at least one data packet arrives successfully within the frame rate.

30. The method of claim 15 wherein the frame rate is determined based on the nature of the optical communication application.

31. The method of claim 15 wherein the step of repeatedly transmitting is such that at least one data packet arrives successfully within the frame rate.

32. The method of claim 24 wherein the frame rate is determined based on the nature of the optical communication application.

33. The method of claim 24 wherein the step of repeatedly transmitting is such that at least one data packet arrives successfully within the frame rate.

* * * * *

UNITED STATES PATENT AND TRADEMARK OFFICE
CERTIFICATE OF CORRECTION

| | | |
|---|---|---|
| PATENT NO. | : 7,009,501 B2 | Page 1 of 1 |
| APPLICATION NO. | : 10/444461 | |
| DATED | : March 7, 2006 | |
| INVENTOR(S) | : Ronald Howard Olch and John Douglas Smith | |

It is certified that error appears in the above-identified patent and that said Letters Patent is hereby corrected as shown below:

On the cover page, in the Inventors section after "Ronald Howard Olch, Van Nuys, CA," insert -- John Douglas Smith, Orlando, FL --.

Signed and Sealed this

Twenty-seventh Day of March, 2007

JON W. DUDAS
*Director of the United States Patent and Trademark Office*